United States Patent [19]

Halstead et al.

[11] 4,448,390
[45] May 15, 1984

[54] VACUUM CONTROL VALVE FOR AUTOMOTIVE HEATING AND AIRCONDITIONING SYSTEMS

[75] Inventors: Raymond T. Halstead, Wheeling; Charles E. Black, III, Mount Prospect, both of Ill.

[73] Assignee: Indak Manufacturing Corp., Northbrook, Ill.

[21] Appl. No.: 455,200

[22] Filed: Jan. 3, 1983

Related U.S. Application Data

[63] Continuation of Ser. No. 237,995, Feb. 25, 1981.

[51] Int. Cl.³ .................................................. F16K 25/00
[52] U.S. Cl. ...................................... 251/176; 137/353; 137/625.48; 137/DIG. 3; 200/61.86
[58] Field of Search ............ 137/353, DIG. 4, 625.48; 251/176, 177, 180; 200/61.86

[56] References Cited

U.S. PATENT DOCUMENTS

| 2,270,838 | 1/1942 | Langdon | 137/DIG. 4 |
| 3,561,475 | 2/1971 | Rockwell | 137/DIG. 4 |
| 3,637,961 | 1/1972 | Fiddler et al. | 137/625.48 X |
| 4,126,153 | 11/1978 | Raab | 137/353 |

FOREIGN PATENT DOCUMENTS 1529774 5/1968 France .......................... 137/DIG. 4

Primary Examiner—Alan Cohan
Assistant Examiner—John A. Rivell
Attorney, Agent, or Firm—Burmeister, York, Palmatier, Hamby & Jones

[57] ABSTRACT

A vacuum control valve comprising a body having a valve surface with a plurality of valve ports extending through the body from such surface, a soft resilient valve member having a control surface slidable along the valve surface and formed with passage means for selectively establishing communication with the valve ports, a movable carriage for receiving and supporting the valve member, and means for moving the carriage along a path substantially parallel with the valve surface, the soft resilient valve member having a soft resilient compressible rear portion formed integrally with such valve member on the opposite side thereof from the control surface, the valve member being confined between the carriage and the valve surface with such soft resilient compressible rear portion in a compressed condition for exerting resilient pressure between the control surface of the valve member and the valve surface of the body, the soft resilient compressible rear portion comprising a pattern of fins alternating with recesses on the valve member, such fins engaging the carriage.

7 Claims, 17 Drawing Figures

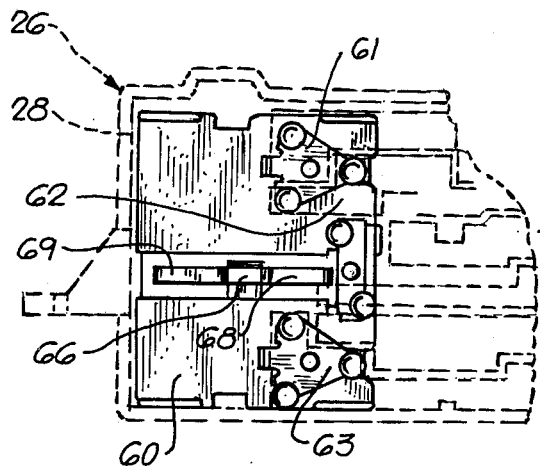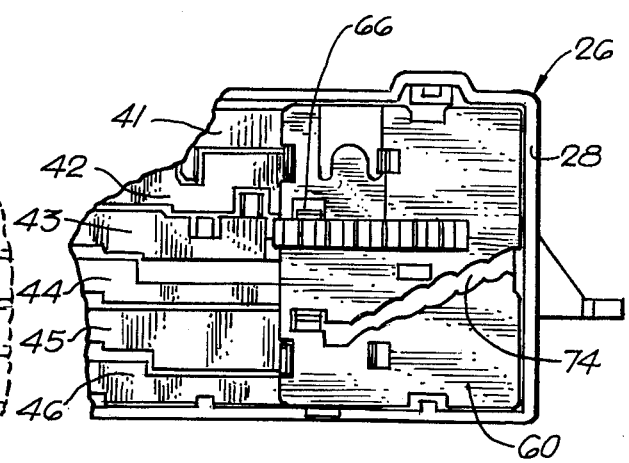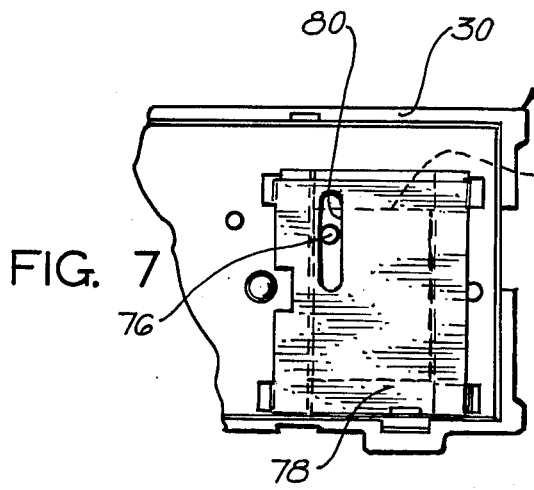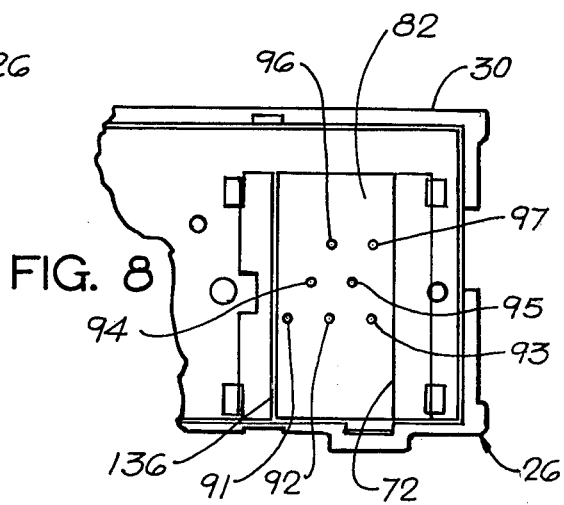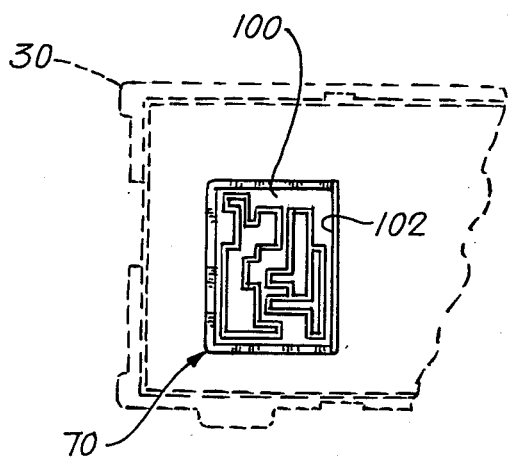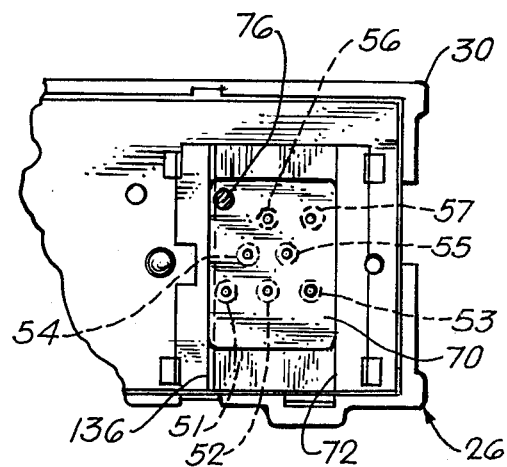

VACUUM CONTROL VALVE FOR AUTOMOTIVE HEATING AND AIRCONDITIONING SYSTEMS

This application is a continuation of application Ser. No. 237,995 filed Feb. 25, 1981.

FIELD OF THE INVENTION

This invention relates to a new and improved vacuum control valve which will find many applications, but is particularly well adapted for controlling various functions in an automotive heating and airconditioning system.

BACKGROUND OF THE INVENTION

This invention embodies improvements over the prior vacuum control valves represented by the Raab and Cobb U.S. Pat. No. 3,942,555; the Raab and Halstead U.S. Pat. No. 4,054,761; and the Raab U.S. Pat. No. 4,126,153. Each of these patents discloses a vacuum control valve which is combined with an electrical switch, for controlling a multiplicity of functions in an automotive heating and airconditioning system.

For example, the Raab and Cobb U.S. Pat. No. 3,942,555, entitled Electrical Switch and Fluid Control Device, discloses a device having three vacuum control valves, shown in FIGS. 12 and 13, which are operated by cam slots formed in electrical switching carriages, shown in FIG. 11. Each vacuum control valve, as shown in FIGS. 16 and 20-24, comprises a valve slider 216 mounted in a movable carriage 218. The slider 216 comprises a sealing member 220, made of silicone rubber, mounted on a backing plate 222 made of metal. A metal spring 230 is compressed between the backing plate 222 and the carriage 218, for biasing the sealing member 218 of the valve slider 216 into sealing engagement with a wall 210 in which valve ports 212 are formed.

The silicone rubber sealing member 220 of the prior Raab and Cobb patent is formed with passages or grooves 224 to afford selective communication between the valve ports 212. The silicone rubber member 220 is bonded or cemented to the metal backing plate 222.

This prior vacuum valve construction is complex and expensive, in that it involves several components, including the movable carriage, the silicone rubber sealing member, the metal backing plate to which the sealing member is cemented or mounted, and the metal spring. The bonding of the silicone rubber to the metal backing plate is a difficult operation which involves quality control problems. The assembly of the several components adds to the cost of the vacuum control valve.

OBJECTS OF THE INVENTION

One object of the present invention is to provide a new and improved vacuum control valve which is simplified, more economical, more effective, and more reliable in construction and operation.

A further object is to provide a new and improved vacuum control valve in which a single valve member, made of silicone rubber or some other soft resilient material, replaces the silicone rubber sealing member, the metal backing plate, and the metal spring of the prior art.

SUMMARY OF THE INVENTION

To accomplish these and other objects, the present invention preferably provides a vacuum control valve, comprising a body having a valve surface with a plurality of valve ports extending through such body from such surface, a soft resilient valve member having a control surface slidable along the valve surface and formed with passage means for selectively establishing communication with the valve ports, a movable carriage for receiving and supporting the valve member, and means for moving the carriage along a predetermined path substantially parallel with the valve surface, the soft resilient valve member having a soft resilient compressible portion formed integrally with the valve member, the soft resilient valve member being confined between the carriage and the valve surface with the soft resilient compressible portion in a compressed condition for exerting resilient pressure between the control surface of the valve member and the valve surface of the body.

The compressible portion of the valve member preferably comprises a pattern of fins alternating with recesses, such pattern being on the opposite side of the valve member from the control surface thereof. The fins preferably engage the carriage, which in some cases may be formed with a pattern of grooves for receiving and stabilizing the rear extremities of such fins. The depth of such grooves is preferably small in comparision with the depth of the fins.

Cross ribs may extend between certain of the fins to afford lateral stability for such fins.

The valve member is preferably made of silicone rubber, some other suitable kind of natural or synthetic rubber, or some other suitable soft resilient rubber-like material, such as various resilient plastics.

The passage means in the soft resilient valve member may comprise a pattern of ridges alternating with hollows on the control surface of such valve member. The configuration of the pattern of fins and recesses on the rear side of the valve member may in some cases be similar to the configuration of the pattern of ridges and hollows on the control surface of the valve member, whereby the fins afford resilient backup for the ridges.

BRIEF DESCRIPTION OF THE DRAWINGS

Further objects, advantages and features of the invention will appear from the following description, taken with the accompanying drawings, in which:

FIG. 5 is a fragmentary rear view of the device, with the rear half of the body or housing removed, to show the electrical switching carriage.

FIG. 6 is a view showing the opposite side of the electrical switching carriage.

FIG. 7 is a fragmentary front view of the vacuum electric control device, with the front half of the housing removed to reveal the valve cover plate and the operating pin of the valve carriage.

FIG. 8 is a view similar to FIG. 7, but with the valve cover plate and the valve carriage removed.

FIG. 9 is a view similar to FIG. 7, but with the valve cover plate removed, to reveal the valve carriage.

FIG. 10 is a view showing the opposite side of the valve carriage, with the soft resilient valve member mounted therein.

DETAILED DESCRIPTION OF EMBODIMENTS

Figures 1, 2:
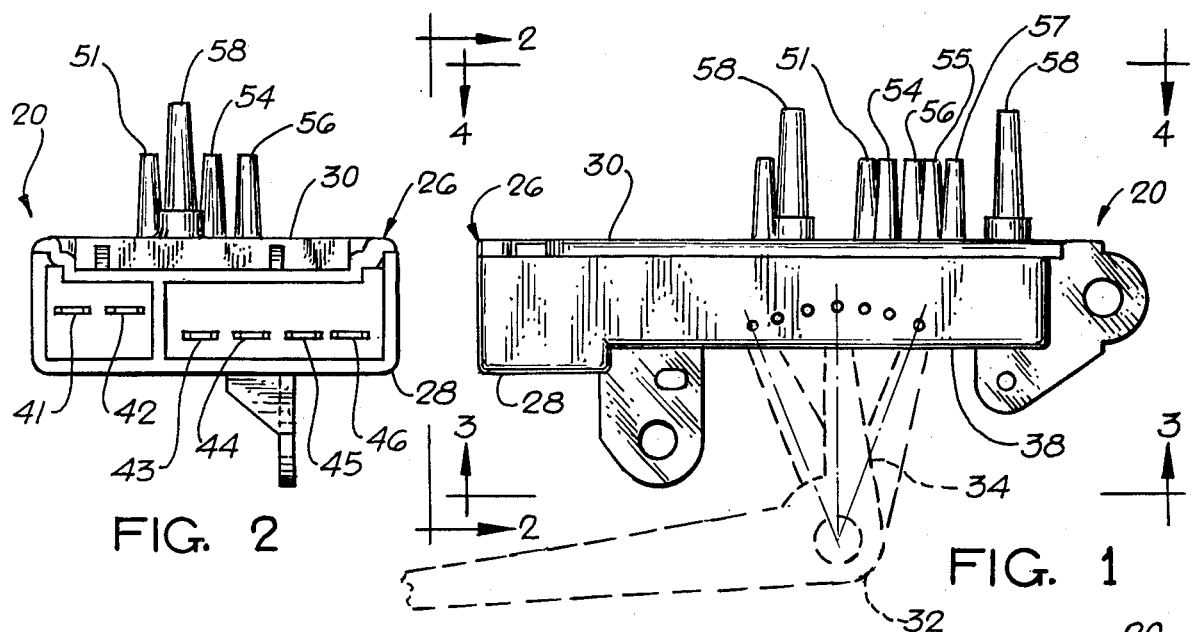
FIG. 1 is a plan view of a vacuum-electric control device to be described as an illustrative embodiment of the present invention.
FIG. 2 is an end view of such device, taken as indicated by the line 2—2 in FIG. 1.
Figure 3:
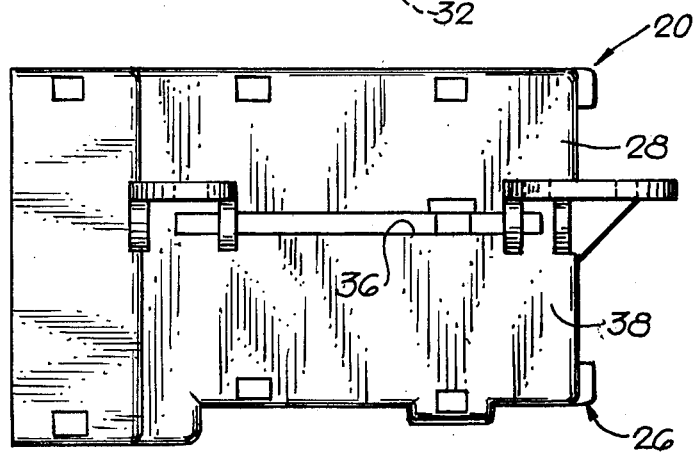
FIG. 3 is a front view, taken as indicated by the line 3—3 in FIG. 1.
Figure 4:
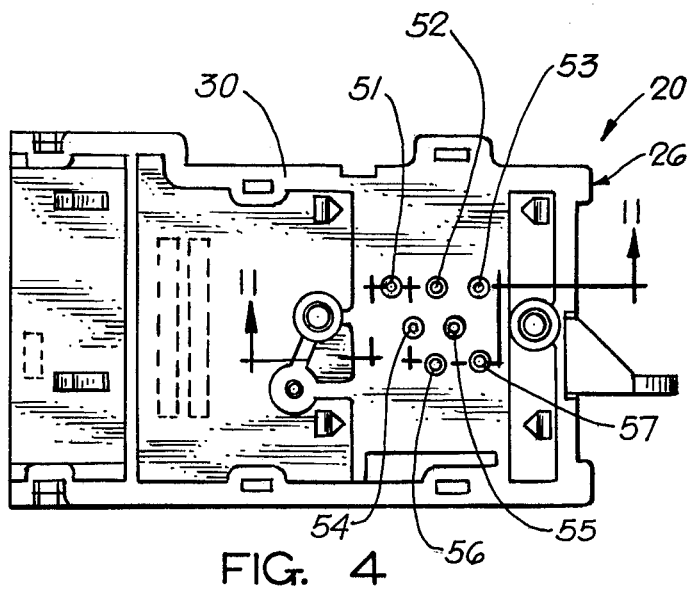
FIG. 4 is a rear view, taken as indicated by the line 4—4 in FIG. 1.

As just indicated, FIGS. 1-4 illustrate the external appearance of a vacuum electric control device 20, which combines electrical switching and fluid control functions. Such device 20 will find various applications, but is particularly well adapted for controlling an automotive heating and airconditioning system. Thus, the device 20 may include an electrical switch 22 (FIG. 11) for controlling the operation and speed of an electrical blower motor, and also for controling the engagement of an airconditioning clutch. In addition, the device 20 may include a vacuum control valve 24 (FIG. 11), for controlling a plurality of vacuum operated power devices, for changing the positions of damper valves or the like in the heating and airconditioning system.

Returning to FIGS. 1-4, the vacuum electric control device 20 comprises a casing or housing 26 having front and rear halves or bodies 28 and 30 which are suitably secured together, as by interfitting snap fasteners.

The vacuum electric control device 20 may be operated by a movable external control lever 32 or some other movable control member, having an arm 34 which extends into the casing 26 through a slot 36 in the front wall 38 of the front body or casing member 28. The lever arm 34 is movable along the slot 36 to operate the control device 20.

The vacuum electric control device 20 has six electrical terminals or prongs 41, 42, 43, 44, 45 and 46, for receiving one or more external electrical connectors or plugs whereby the electrical switch 22 is connected to the electrical circuits of the heating and airconditioning system.

To provide for vacuum control connections, the control device 20 is also provided with a group of seven nipples 51-57, projecting rearwardly from the rear casing member 30, for receiving a vacuum connector or coupling, whereby vacuum hoses or tubes are connected to the nipples. Such hoses extend to the vacuum supply and also to the various vacuum power devices. In this case, the device 20 has other nipple-shaped projections 58 which serve as locating pins for the vacuum connector.

Figure 11:
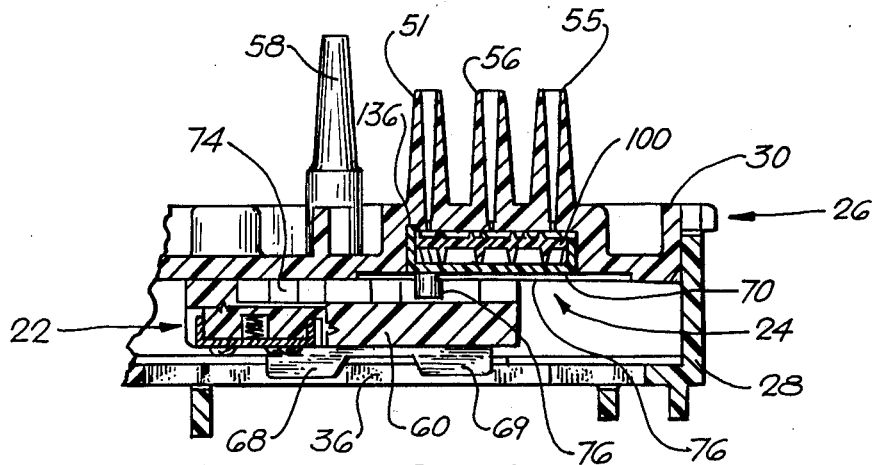
FIG. 11 is a fragmentary sectional view, taken generally along the line 11—11 in FIG. 4, through the valve carriage and the soft resilient valve member.

As shown in FIGS. 5, 6 and 11, the electrical switch 22 includes a switching carriage 60, preferably made of an electrically insulating material, which is slidable longitudinally within the front half 28 of the casing 26. One or more electrical contactors are mounted on the carriage 60, for selective engagement with fixed contact members, connected to the electrical terminals 41-46. In this case, the carriage 60 is provided with three electrical contactors 61, 62 and 63, as shown in FIG. 6.

The carriage 60 is adapted to be operated by the arm 34 of the external lever 32. The carriage 60 has a slot 66 for receiving the rear end of the lever arm 34. Such slot 66 is aligned with the slot 36 in the front wall 38 of the casing 26. The carriage 60 has flanges or tabs 68 and 69 which are slidably received in the slot 36.

In addition to performing electrical switching functions, the carriage 60 is adapted to operate the vacuum control valve 24, which comprises a movable valve carriage 70, which is slidable in a channel 72, extending transversely in the front half 30 of the casing 26, as shown in FIGS. 8 and 9. The valve carriage 70 is slidable in a direction which is transverse to the longitudinal path of the switching carriage 60. The valve carriage 70 is operable by camming means, illustrated as comprising a diagonal cam slot 74 in the switching carriage 60, adapted to receive a cam follower 76 on the valve carriage 70. Such follower 76 is shown as a pin which is formed on the valve carriage 70 and which projects therefrom into the cam slot 74 in the switching carriage 60. In the illustrated construction, the valve carriage 70 is retained in the valve channel 72 by a cover plate 78, interposed between the switching carriage 60 and the valve carriage 70. Such plate 78 may be made of metal or other suitable material. As shown in FIG. 7, the plate 78 is formed with a slot 80 through which the follower pin 76 projects, and along which the pin is movable.

The front half or body member 30 of the casing 26 is formed with a valve surface 82 which faces forwardly toward the valve carriage 70 and constitutes the rear boundary of the valve channel 72. The valve carriage 70 is supported in the channel 72 for sliding movement parallel with the valve surface 82.

It will be seen from FIGS. 8 and 9 that the valve surface 82 is formed with a plurality of valve ports, extending through the body member 30 from the valve surface 82. Such valve ports connect with the nipples 51-57. Thus, there are seven valve ports 91-97 in this instance. The vacuum control valve 24 provides selective communication with and between the various valve ports 91-97.

Figure 12:
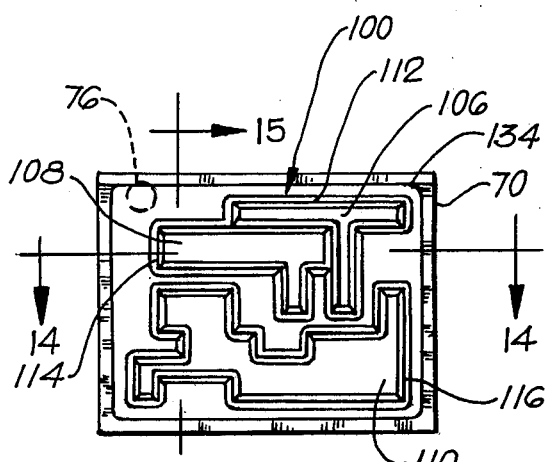
FIG. 12 is an enlarged view, similar to FIG. 10, to show the control surface of the soft resilient valve member, with such valve member mounted in the valve carriage.

The movable valve carriage 70 supports and carries a movable valve member 100, shown to best advantage in FIGS. 10-16. The valve member 100 is made of a soft resilient material, preferably silicone rubber, because of its durability and resistance to heat and lubricants. However, the vacuum valve member 100 may be made of other suitable soft resilient materials, such as various kinds of natural or synthetic rubber, or other rubberlike materials, such as various soft resilient plastic materials. It will be seen that the soft resilient valve member 100 is generally in the form of a rectangular body which is received within a cavity or hollow space 102 within the carriage 70. The valve member 100 has a control surface 104 which faces rearwardly and is slidable along the valve surface 82 on the body member 30. The control surface 104 of the soft resilient valve member 100 is formed with passage means for selectively establishing communication with and between the valve ports 91–97. As best shown in FIG. 12, such passage means may comprise a system or configuration of grooves or recesses 106, 108 and 110, bounded by ridges or dams 112, 114 and 116. The shape or configuration of the grooves and ridges is designed to afford communication between various combinations of the ports 91–97 in various positions of the soft resilient valve member 100. The grooves and ridges may be molded in one piece with the soft resilient valve member 100.

The ridges 112, 114 and 116 on the control surface 104 of the valve member 100 are resiliently pressed against the valve surface 82 by a resiliently compressible portion 120 of the soft resilient valve member which is confined between the valve carriage 70 and the valve surface 82. This confinement maintains the soft resilient valve member in a compressed condition.

Figure 14:
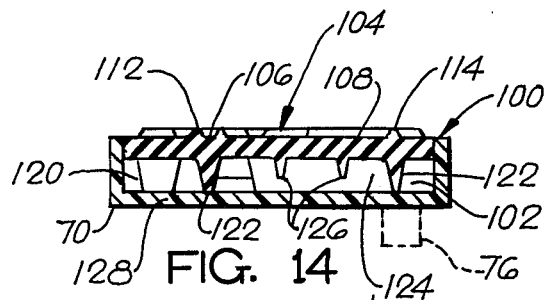
FIGS. 14 and 15 are sectional views, taken generally along the lines 14—14 and 15—15 in FIGS. 12 and 13.
Figure 13:
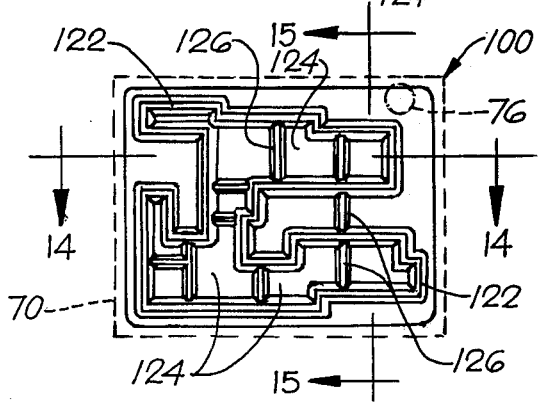
FIG. 13 is a view showing the opposite side of the soft resilient valve member, with the pattern of compressible fins alternating with recesses.
Figure 15:
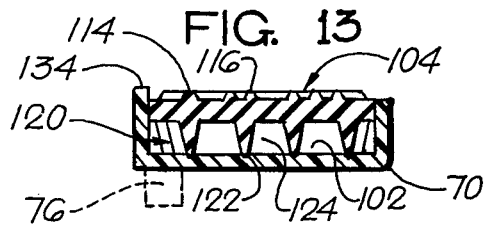

As shown to best advantage in FIGS. 13–15, the compressible portion 120 of the soft resilient valve member 100 preferably comprises a pattern or configuration of fins 122, alternating with recesses 124, formed in the opposite side of the valve member, relative to the side on which the control surface 104 is formed. The fins 122 are of a considerable depth so that the fins are resiliently compressible. In some cases, the pattern or configuration of the fins 122 is similar to the pattern of the ridges 112, 114 and 116, as will be evident from a comparison of FIGS. 12 and 13, so that the fins 122 provide a resilient backup for the ridges. It will be seen from FIG. 13 that cross ribs 126 may be provided between certain of the fins 122, to provide lateral support and stability for the fins. The fins 122, the recesses 124 and the ribs 126 are molded in one piece with the soft resilient valve member 100.

Figure 16:
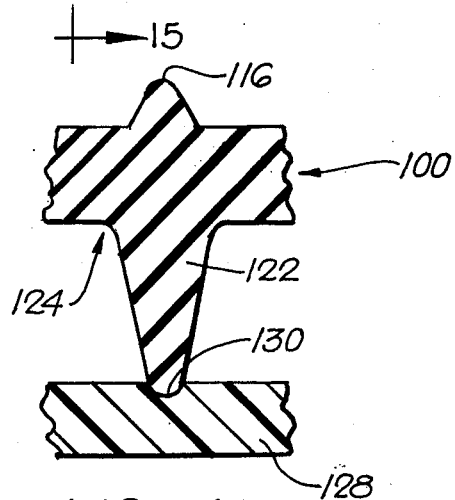
FIG. 16 is a greatly enlarged fragmentary section, corresponding to a portion of FIG. 15.

From FIGS. 15 and 16 it will be evident that the valve carriage 70 has a front wall 128 which is engaged by the extremeties of the fins 122. The wall 128, as shown in FIG. 16, may be formed with a pattern of shallow grooves 130 for receiving and locating the extremeties of the fins 122. The grooves 130 affort lateral support for the fins 122. The depth of the grooves 130 is small in comparison with the depth of the fins 122.

Figure 17:
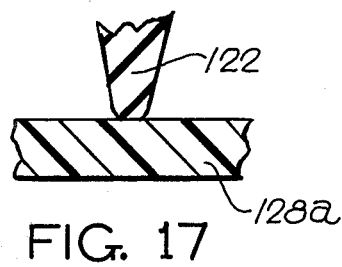
FIG. 17 is a greatly enlarged fragmentary section, similar to FIG. 16, but showing a modified construction.

As shown in FIG. 17, the provision of the grooves 130 is an optional feature which may be omitted, if desired. FIG. 17 shows a modified wall 128a which is engaged by the extremeties of the fins 122, but is not formed with the grooves 130 of FIG. 16.

As shown in FIGS. 11, 12 and 15, the valve carriage 70 is formed with a guide flange 134 which is slidably received in a guide groove 136, formed in the rear casing member 30 along one edge of the channel 72. Such guide groove 136 is also shown in FIGS. 8 and 9.

In operation, the soft resilient valve member 100 is confined within the hollow space or cavity 102 in the valve carriage 70 and is movable with the carriage along the channel 72. The control surface 104 of the valve member 100 is slidable along the valve surface 82 in which the ports 91–97 are formed. The passages or grooves 106, 108 and 110 in the control surface 104 provide selective communication with and between the various ports 91–97. Such grooves 106, 108 and 110 are bounded by the ridges 112, 114 and 116, which are pressed against the valve surface 82 by the resilient spring action of the compressible portion 120 of the soft resilient valve member 100. The compressibility of the portion 120 is achieved by providing the alternate fins 122 and recesses 124.

The soft resilient valve member 100 is confined between the valve carriage 70 and the valve surface 82, with the compressible portion 120 of the valve member in a compressed condition, to provide the resilient pressure between the control surface 104 of the valve member and the valve surface 82. The valve carriage 70 is confined by the cover plate 78 which is confined by the electrical carriage 60. The valve carriage 70 is adapted to be moved along the channel 72 by the camming action between the cam groove 74 in the electrical carriage 60 and the follower pin 76 on the valve carriage 70. The electrical carriage 60 is moved by the external lever 32. The arm 34 of such lever 32 extends through the slots 36 in the front casing wall 38 and into the slot 66 in the carriage 60.

The cross ribs 126 improve the lateral stability of the compressible fins 122 to control the buckling of the fins. The lateral stability of the fins 122 is also improved by the pattern of grooves 130 in the carriage wall 128. Such grooves 130 serve to locate and stabilize the fins 122.

The soft resilient valve member 100 may be molded in one piece and thus may be made economically. The one piece valve member 100 replaces the sealing member, the backing plate and the separate spring of the prior art, and thus affords considerable economies. At the same time, the one piece valve member 100 is highly effective and dependable in operation. The resilient compressible fins 122 are arranged in a configuraion to produce a high degree of uniformity in the resilient pressure between the valve surface 82 and the ridges 112, 114 and 116 on the soft resilient valve member 100. The configuration of the fins 122 may be similar to the configuration of the ridges 112, 114 and 116. Thus the fins 122 are generally aligned with the ridges and provide resilient backup means for the ridges.

We claim:
1. A vacuum control valve, comprising
a body having a valve surface with a plurality of valve ports extending through said body from said surface,
a soft resilient valve member having a control surface slidable along said valve surface and formed with passage means for selectively establishing communication with said valve ports,
a movable carriage for receiving and supporting said valve member,
and means for moving said carriage along a predetermined path substantially parallel with said valve surface,
said soft resilient valve member having a soft resilient compressible rear portion formed integrally with said valve member on the opposite side thereof from said control surface,
said soft resilient valve member being confined between said carriage and said valve surface with said soft resilient compressible rear portion in a compressed condition for exerting resilient pressure between said control surface of said valve member and said valve surface of said body,
said soft resilient compressible rear portion comprising a pattern of fins on said valve member and alternating with recesses therein to afford resilient compressibility,
said fins projecting from said valve member toward said carriage and engaging said carriage, said carriage being formed with a pattern of shallow grooves for receiving and stabilizing the rear portions of said fins, the depth of said grooves being small in comparison with the depth of said fins.

2. A vacuum control valve, comprising a body having a valve surface with a plurality of valve ports extending through said body from said surface, a soft resilient valve member having a control surface slidable along said valve surface and formed with passage means for selectively establishing communication with said valve ports, a movable carriage for receiving and supporting said valve member, and means for moving said carriage along a predetermined path substantially parallel with said valve surface, said soft resilient valve member having a soft resilient compressible rear portion formed integrally with said valve member on the opposite side thereof from said control surface, said soft resilient valve member being confined between said carriage and said valve surface with said soft resilient compressible rear portion in a compressed condition for exerting resilient pressure between said control surface of said valve member and said valve surface of said body, said soft resilient compressible rear portion comprising a pattern of fins on said valve member and alternating with recesses therein to afford resilient compressibility, said fins projecting from said valve member toward said carriage and engaging said carriage, and cross ribs extending between certain of said fins and affording lateral stability for said fins.

3. A vacuum control valve, comprising a body having a valve surface with a plurality of valve ports extending through said body from said surface, a soft resilient valve member having a control surface slidable along said valve surface and formed with passage means for selectively establishing communication with said valve ports, a movable carriage for receiving and supporting said valve member, and means for moving said carriage along a predetermined path substantially parallel with said valve surface, said soft resilient valve member having a soft resilient compressible rear portion formed integrally with said valve member on the opposite side thereof from said control surface, said soft resilient valve member being confined between said carriage and said valve surface with said soft resilient compressible rear portion in a compressed condition for exerting resilient pressure between said control surface of said valve member and said valve surface of said body, said soft resilient compressible rear portion comprising a pattern of fins on said valve member and alternating with recesses therein to afford resilient compressibility, said fins projecting from said valve member toward said carriage and engaging said carriage, said passage means comprising a pattern of ridges alternating with hollows on said control surface of said valve member, the configuration of said pattern of fins are recesses being similar to the configuration of said pattern of ridges and hollows, whereby said fins afford resilient backup for said ridges.

4. A vacuum control valve, comprising a body having a valve surface with a plurality of valve ports extending through said body from said surface, a soft resilient valve member having a control surface slidable along said valve surface and formed with passage means for selectively establishing communication with said valve ports, a movable carriage for receiving and supporting said valve member, and means for moving said carriage along a predetermined path substantially parallel with said valve surface, said body having guide means for slidably guiding said carriage for sliding movement along said predetermined path, said guide means including a flat guide member spaced from and parallel with said valve surface, said valve member and said carriage being movable in the space between said valve surface and said guide member, said soft resilient valve member having a soft resilient compressible rear portion formed integrally with said valve member on the opposite side thereof from said control surface, said soft resilient valve member being confined between said carriage and said valve surface with said soft resilient compressible rear portion in a compressed condition for exerting resilient pressure between said control surface of said valve member and said valve surface of said body, said soft resilient compressible rear portion comprising a pattern of fins on said valve member and alternating with recesses therein to afford resilient compressibility, said fins projecting from said valve member toward said carriage and engaging said carriage, said fins having a depth substantially greater than the width of said fins to provide sufficient resilient compressibility of said fins to afford a spring action constituting the sole spring action for resiliently pressing said valve member against said valve surface to maintain said valve member in slidable sealing engagement with said valve surface, said fins also constituting the sole spring action resiliently pressing said carriage into direct sliding engagement with said guide member.

5. A vacuum control valve, comprising a body having a valve surface with a plurality of valve ports extending through said body from said surface, a soft resilient valve member having a control surface slidable along said valve surface and formed with passage means for selectively establishing communication with said valve ports, a movable carriage for receiving and supporting said valve member, and means for moving said carriage along a predetermined path substantially parallel with said valve surface, said body having guide means for slidably guiding said carriage for sliding movement along said predetermined path, said guide means including a flat guide member spaced from and parallel with said valve surface, said valve member and said carriage being movable in the space between said valve surface and said guide member, said soft resilient valve member having a soft resilient compressible rear portion formed integrally with said valve member on the opposite side thereof from said control surface, said soft resilient valve member being confined between said carriage and said valve surface with said soft resilient compressible rear portion in a compressed condition for exerting resilient pressure between said control surface of said valve member and said valve surface of said body, said soft resilient compressible rear portion comprising a pattern of fins on said valve member and alternating with recesses therein to afford resilient compressibility, said fins projecting from said valve member toward said carriage and engaging said carriage, said fins tapering in width toward the extremities of said fins and providing sufficient resilient compressibility of said fins to afford a spring action constituting the sole spring action for resiliently pressing said valve member against said valve surface to maintain said valve member in slidable sealing engagement with said valve surface, said fins also constituting the sole spring action resiliently pressing said carriage into direct sliding engagement with guide member.

6. A vacuum control valve, comprising a body having a valve surface with a plurality of valve ports extending through said body from said surface, a soft resilient valve member having a control surface slidable along said valve surface and formed with passage means for selectively establishing communication with said valve ports, a movable carriage for receiving and supporting said valve member, and means for moving said carriage along a predetermined path substantially parallel with said valve surface, said body having guide means for slidably guiding said carriage for sliding movement along said predetermined path, said guide means including a flat guide member spaced from and parallel with said valve surface, said valve member and said carriage being movable in the space between said valve surface and said guide member, said soft resilient valve member having a soft resilient compressible rear portion formed integrally with said valve member on the opposite side thereof from said control surface, aid soft resilient valve member being confined between said carriage and said valve surface with said soft resilient compressible rear portion in a compressed condition for exerting resilient pressure between said control surface of said valve member and said valve surface of said body, said soft resilient compressible rear portion comprising a pattern of fins on said valve member and alternating with recesses therein to afford resilient comressibility, said fins projecting from said valve member toward said carriage and engaging said carriage, said passage means comprising a pattern of ridges alternating with hollows on said control surface of said valve member, said ridges slidably engaging said valve surface, said fins having a depth substantially greater than the depth of said ridges and providing sufficient resilient compressibility of said fins to afford a spring action constituting the sole spring action for resiliently pressing said valve member against said valve surface to maintain said ridges in sealing engagement with said valve surface, said fins also constituting the sole spring action resiliently pressing said carriage into direct sliding engagement with said guide member.

7. A vacuum control valve, comprising a body having a valve surface with a plurality of valve ports extending through said body from said surface, a soft, resilient rubber valve member having a control surface slidable along said valve surface and formed with passage means for selectively establishing communication with said valve ports, a movable carriage for receiving and supporting said valve member, and means for moving said carriage along a predetermined path substantially parallel with said valve surface, said body having guide means for slidably guiding said carriage for sliding movement along said predetermined path, said guide means including a flat guide member spaced from and parallel with said valve surface, said valve member and said carriage being movable in the space between said valve surface and said guide member, said soft resilient valve member having a soft resilient compressible rubber rear portion formed integrally with said valve member on the opposite side thereof from said control surface, said soft resilient valve member being confined between said carriage and said valve surface with said soft resilient compressible rear portion in a compressed condition for resiliently exerting pressure between said control surface of said valve member and said valve surface of said body, said soft resilient compressible rear portion comprising a pattern of rubber fins on said valve member and alternating with recesses therein to afford resilient compessibility, said fins projecting from said valve member toward said carriage and engaging said carriage, said passage means comprising a pattern of ridges alternating with hollows on said control surface of said valve member, said ridges slidably engaging said valve surface, said fins tapering in width toward the extremities of said fins and having a depth substantially greater than the greatest width of said fins to provide sufficient resilient compressibility of said fins to afford a spring action constituting the sole spring action resiliently biasing said valve member against said valve surface to produce pressure and maintain said ridges in slidable sealing engagement with said valve surface, said fins having a depth substantially greater than the depth of said ridges and affording substantially greater resilient compressibility than afforded by said ridges, said fins also constituting the sole spring action resiliently biasing said carriage into direct sliding engagement with said guide member and resiliently maintaining pressure between said carriage and said guide member.

* * * * *